(12) United States Patent
Abramsky (10) Patent No.: US 8,958,791 B2
(45) Date of Patent: Feb. 17, 2015

(54) SYSTEM TO COMMUNICATE BETWEEN A FEMTOCELL BASE STATION AND MOBILE DEVICES

(75) Inventor: Victor A. Abramsky, Southampton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 12/409,362

(22) Filed: Mar. 23, 2009

(65) Prior Publication Data
US 2010/0240347 A1 Sep. 23, 2010

(51) Int. Cl.
*H04W 4/00* (2009.01)
*H04W 36/38* (2009.01)

(52) U.S. Cl.
CPC .................................. *H04W 36/385* (2013.01)
USPC ..... 455/426.1; 455/403; 455/461; 455/550.1; 455/552.1; 455/553

(58) Field of Classification Search
USPC ........ 455/461, 403, 550.1, 551, 552.1, 553.1, 455/554.1, 554.2, 555, 556.1, 556.2, 557, 455/558
See application file for complete search history.

(56) References Cited

U.S. PATENT DOCUMENTS

| | | | |
|---|---|---|---|
| 5,371,781 A | 12/1994 | Ardon | |
| 6,490,457 B1 | 12/2002 | Lee | |
| 6,940,960 B2 | 9/2005 | Benco et al. | |
| 7,035,646 B2 | 4/2006 | Raffel et al. | |
| 2004/0152482 A1* | 8/2004 | Raffel et al. | 455/522 |
| 2004/0180654 A1 | 9/2004 | Chen | |
| 2007/0067387 A1 | 3/2007 | Jain et al. | |
| 2007/0167157 A1 | 7/2007 | Hundal | |
| 2009/0233574 A1* | 9/2009 | Shinozaki | 455/404.2 |
| 2009/0274104 A1* | 11/2009 | Addy | 370/329 |
| 2009/0286544 A1* | 11/2009 | Huber et al. | 455/450 |
| 2010/0136943 A1* | 6/2010 | Hirvela et al. | 455/404.1 |

OTHER PUBLICATIONS

3GPP2-Drafts, 2500 Wilson Boulevard, Suite 300, Arlington, Virginia 22201 USA, Mar. 6, 2002, XP040347788 Call Forwarding; paragraph [5.27] Flexible Alerting; paragraph [5.33] User Group; paragraph [5.50].
International Search Report and Written Opinion—PCT/US2009/042873—ISA/EPO—Dec. 16, 2009.
Taiwan Search Report—TW098114905—TIPO—Jun. 27, 2012.

\* cited by examiner

*Primary Examiner* — Vladimir Magloire
*Assistant Examiner* — Sayed T Zewari
(74) *Attorney, Agent, or Firm* — Fariba Yadegar-Bandari (57) ABSTRACT

This patent discloses a method to communicate between a femtocell base station and mobile devices. The method may include identifying as an alert group a set of mobile devices presently in communication with the femtocell base station and whose unique identifiers are preregistered with the femtocell base station. A first mobile device and a second mobile device may be in the set of femtocell service region mobile devices. The femtocell base station may receive a call from a third mobile device. If the call is for the second mobile device, then the method may send a paging message from the femtocell base station. The paging message may include a first unique identifier associated with the first mobile device.

29 Claims, 3 Drawing Sheets

SYSTEM TO COMMUNICATE BETWEEN A FEMTOCELL BASE STATION AND MOBILE DEVICES

BACKGROUND

1. Field

The following description relates generally to wireless communications, and more specifically to allowing one or more mobile devices registered with a femtocell base station as part of an alert group to be alerted to the same incoming call.

2. Background

Signals sent and received by mobile devices typically are transmitted wirelessly through the air as well as transmitted through wires. A macrocell base station may cover an outdoor cell site of about five kilometers to receive wireless signals from a relatively large number of mobile devices. The previously wireless signals then may be transmitted through wires into a telecommunications network.

About half the calls from mobile device are made from inside a home, whose construction may interfere with wirelessly transmitting the signal to a macrocell base station. Many more are made from inside office buildings, whose deep interiors and concrete walls may eliminate reception to a macrocell base station. Consumers find it desirable to have use of their mobile devices where ever they happen to be. Operators find it desirable to offload this traffic from their outdoor macrocell base stations. By not using the macrocell resources to provide in-building service, operators can provide better service to mobile users and with fewer expensive macrocell base stations.

In the early 2000s, companies looked into providing residential base stations, essentially an in-home base station that would communicate wireless signals from within the home and then send those signals into the telecommunications network through wires such as a residential digital subscriber line. The results of those efforts lead to the development of femtocell base stations. A femtocell base station is a small, box-sized device that may cover an indoor cell site of a few dozen to a couple hundred meters. A main advantage of a femtocell base station is that it allows users in a home or office to use their mobile device without concern that the walls of their building will significantly weaken their signal.

While femtocell base stations may cover a relatively small, geographic area, consumers often have multiple wireless handsets located throughout the home or office, each with a unique phone number. When a caller dials to reach a household, that call is routed to the phone identified by the unique phone number. This inconveniently may require a homeowner to carry that mobile device around the house to make sure that it may be reached when called. In addition, if the caller is trying only to contact someone within the house location rather than a particular person, the caller will need to try his or her luck with one number hoping that the dialed phone is in the house and within reach. It is desirable to address these and other issues.

SUMMARY

This patent discloses a method to communicate between a femtocell base station and mobile devices. The method may include identifying as an alert group a set of mobile devices presently in communication with the femtocell base station and whose unique identifiers are preregistered with the femtocell base station. A first mobile device and a second mobile device may be in the set of femtocell service region mobile devices. The femtocell base station may receive a call from a third mobile device. If the call is for the second mobile device, then the method may send a paging message from the femtocell base station. The paging message may include a first unique identifier associated with the first mobile device.

BRIEF DESCRIPTION OF THE DRAWINGS

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device may also be called, and may contain some or all of the functionality of a system, subscriber unit, subscriber station, mobile station, mobile, wireless terminal, device, remote station, remote terminal, access terminal, user terminal, terminal, wireless communication device, wireless communication apparatus, user agent, user device, or user equipment (UE). A mobile device may be a cellular telephone, a cellular mobile device, a cordless telephone, a Session Initiation Protocol (SIP) phone, a smart phone, a wireless local loop (WLL) station, a personal digital assistant (PDA), a laptop, a handheld communication device, a handset, a phone, a handheld computing device, a satellite radio, a wireless modem card and/or another processing device for communicating over a wireless system. Moreover, various aspects are described herein in connection with a base station. A base station may be utilized for communicating with wireless terminal(s) and also may be called, and may contain some or all of the functionality of, an access point, Node B, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figures 1, 2:
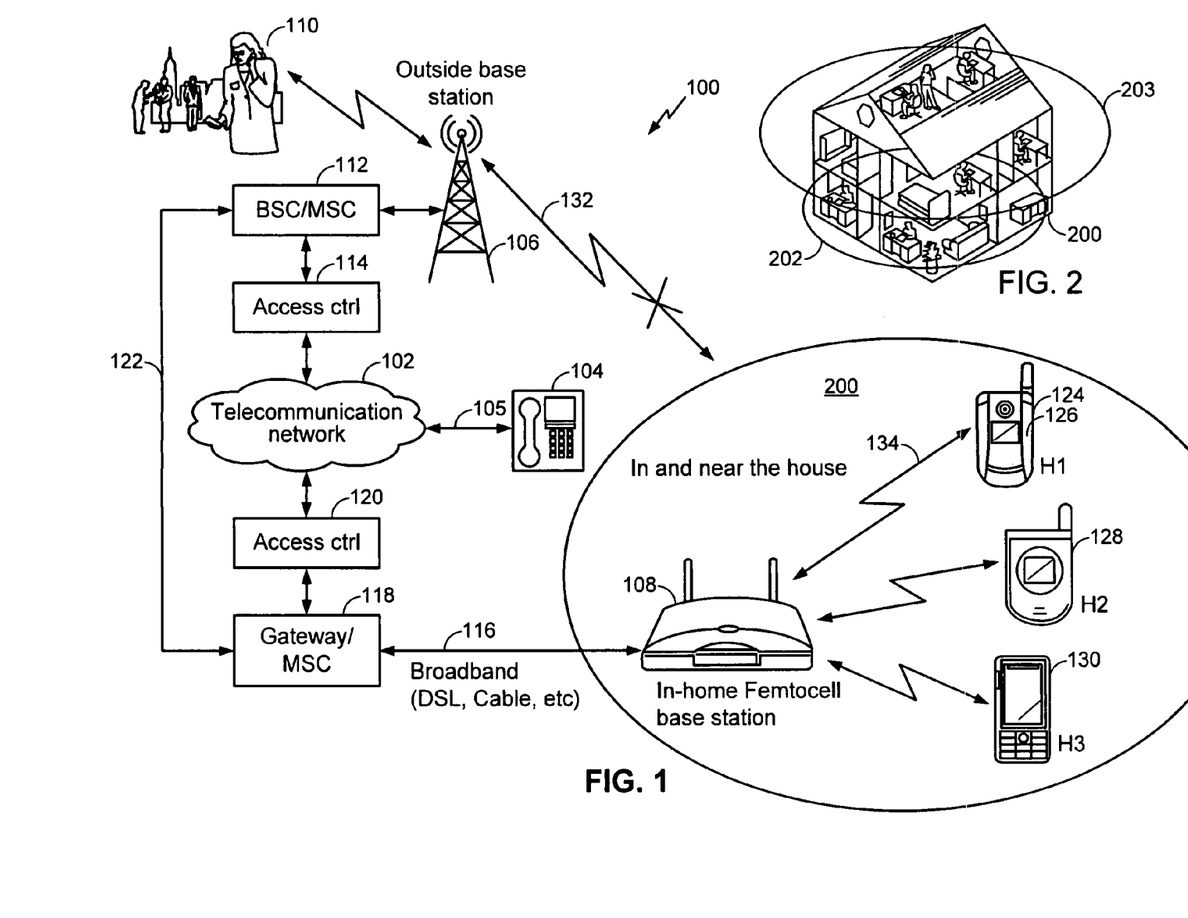
FIG. 1 is a schematic diagram of a telecommunication system 100.
FIG. 2 is a schematic of building 200.

FIG. 1 is a schematic diagram of a telecommunication system 100. Telecommunication system 100 may include a group of independent but interrelated elements to assist in the transmission of signals over a distance for a purpose of communication. Telecommunication system 100 may include a telecommunication network 102 that may be accessed through a variety of ways, including a landline 104, a macrocell base station 106, and a femtocell base station 108.

Telecommunication network 102 may be a network of telecommunications links and nodes arranged so that messages may be passed from one part of the network to another over multiple links and through various nodes. Telecommunication network 102 may include a computer network, the internet network as a global 'network of networks', a public switched telephone network, a global telex network, and the aeronautical Aircraft Communications Addressing and Reporting System network. In addition, telecommunication network 102 may carry control information, traffic from the users of the network, and operations and administration traffic required for network management.

Landline 104 may be a telephone line that may communicate with telecommunication network 102 through a signal that may travel through a metal wire, optical fiber, or other solid medium 105. Also known as a main line and a fixed-line, landline 104 may include a telephone whose signaling and audio information may be handled on a twisted pair of insulated wires. A twisted pair line may be more effective at rejecting electromagnetic interference and crosstalk than an untwisted pair.

Macrocell base station 106 may be a tower installed at a fixed location and having an antenna to provide outdoor coverage for mobile device signals 110 within a 3 mile (5 kilometer) radius. Macrocell base station 106 may access telecommunication network 102 through a Base Station Controller (BSC)/Mobile Switching Center (MSC) 112 and access control 114. The Base Station Controller portion of BSC/MSC 112 may act as a concentrator where many different low capacity connections become reduced to a smaller number of connections towards the Mobile Switching Center. Access control 114 may define or restrict passage of signals between BSC/MSC 112 and telecommunication network 102.

Femtocell base station 108 may be a small cellular base station for use in and near small business environments or residential environments, such as a building 200. Femtocell base station 108 may allow service providers to extend cellular service coverage indoors, especially where access otherwise may be limited or unavailable. In addition, femtocell base station 108 may provide a service to cellular users that happen to be in close proximity to femtocell base station 108, where its signal may be stronger than that of a macrocell. By directing calls to a consumer installed femtocell that also uses consumer owned backhaul, such as DSL or cable, the cellular network operator may realize substantial savings in capital and operating expenditures. As a personal miniature base station installed in subscriber's location, femtocell base station 108 may employ the radio access network (RAN) functionality (e.g., BTS, BSC, PDSN) and provide service to limited number of users. Femtocell base station 108 may provide service similar to a typical PSTN connected wired or cordless phone system with multiple receivers. Femtocell base station 108 may be a device that is not a mobile device.

Femtocell base station 108 may communicate with telecommunication network 102 through backhaul 116, gateway/Mobile Switching Center (MSC) 118, and access control 120. Backhaul 116 may transport traffic between distributed sites provided by gateway/MSC 118 and the more centralized points of presence femtocell base station 108. Typically, femtocell base station 108 may be connected to the Internet and the cellular operator's network via DSL router or cable modem. In an example, backhaul 116 may include at least one of a consumer owned digital subscriber line (DSL), a cable, and a fiber link. Gateway/MSC 118 and access control 120 may function similarly to BSC/MSC 112 and access control 114, respectively. BSC/MSC 112 and Gateway/MSC 118 may transmit signals back and forth over a signal path 122.

FIG. 2 is a schematic of building 200. Building 200 may be a structure that has a roof and walls, including a residential home or office building. Femtocell base station 108 may service mobile devices 124 in and near building 200. For example, femtocell base station 108 may serve mobile devices 124 within a femtocell service region 202. Femtocell service region 202 may be that geographic region within which mobile devices 124 may communicate with femtocell base station 108. Femtocell base station 108 typically may support up to eight mobile devices 124 in a residential setting. In an example, femtocell base station 108 may support mobile device 126 (handset 1 or H1) (FIG. 1), mobile device 128 (handset 2 or H2), and mobile device 130 (handset 3 or H3).

In operation, building 200 may prevent reasonable connection between macrocell base station 106 and mobile devices 124 through a macrocell base station signal 132. Interior walls, exterior walls, and windows may result in signal power loss over a traveled path. When femtocell base station 108 is installed in building 200, mobile devices 124 may communicate exclusively with femtocell base station 108 through a mobile device signal 134 with de minims power loss.

Figure 3:
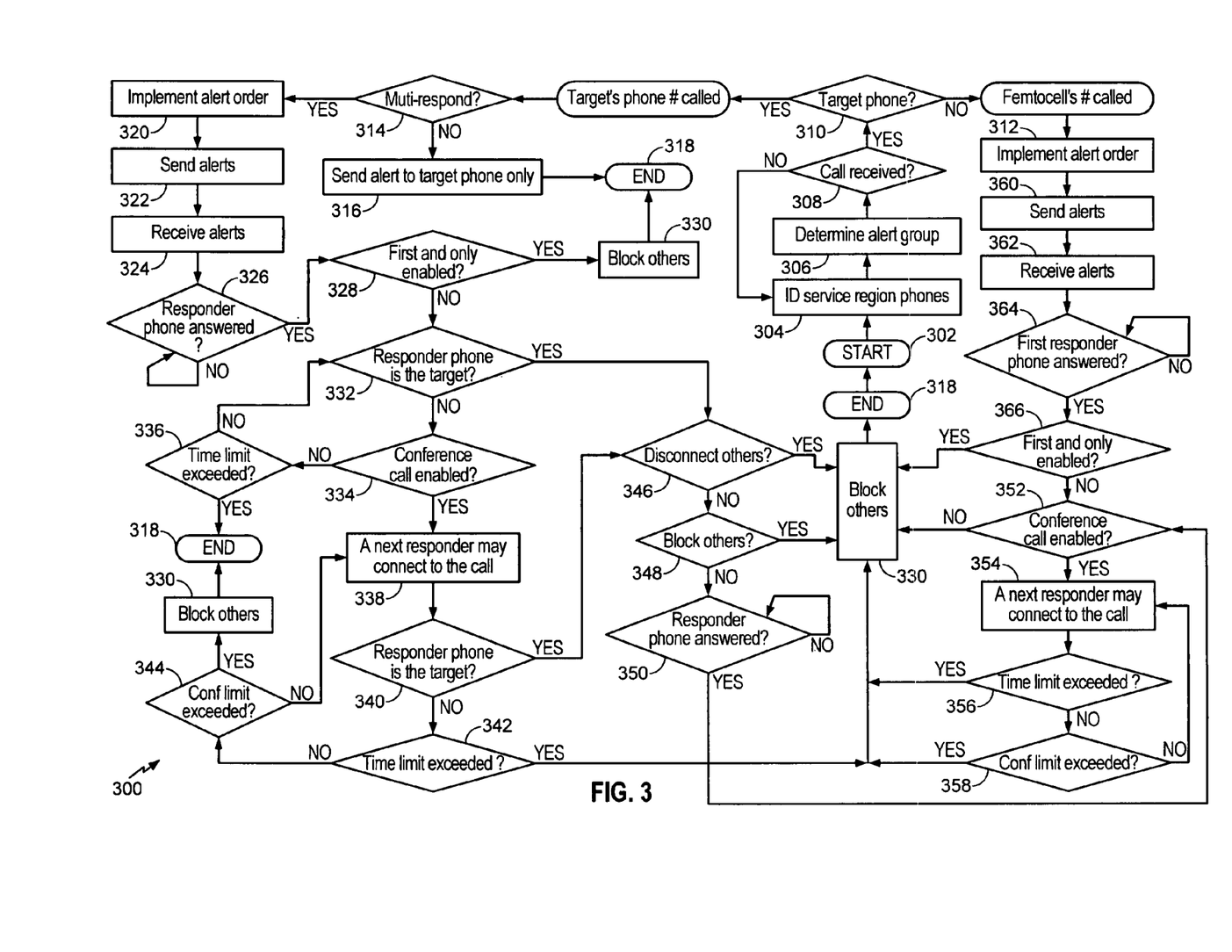
FIG. 3 is a block diagram illustrating a method 300 to communicate between femtocell base station 108 and mobile devices 124.

FIG. 3 is a block diagram illustrating a method 300 to communicate between femtocell base station 108 and mobile devices 124. Method 300 adds a capability to femtocell base station 108 to utilize a paging message to alert/ring mobile devices 124 preregistered with the particular femtocell base station 108 as their in-home femtocell base station. Thus, method 300 may permit a caller to reach a household in general by dialing a particular mobile device serviced by the in-home femtocell base station 108. Here, the caller need not know several numbers of phones within building 200. In addition, one or more mobile device within a set of mobile devices preregistered with femtocell base station 108 as their in-home femtocell base station may receive a call destined for any phone belonging to the preregistered set, even though each preregistered mobile device may have a different number. Other mobile devices 124 that answer the same call may either share the connection (conference call mode) or be disconnected. As a result, method 300 may increase consumer adoption of femtocell base stations 108 and increase sales of cell phones by creating an environment where a femtocell base station 108 may be used to enable a cell-phone based multi-receiver home phone system.

Method 300 may begin at step 302. At step 304, method 300 may identify all mobile devices 124 within femtocell service region 202. For example, femtocell base station 108 may receive a signal from mobile device 124, which indicates that mobile device 124 is registered with femtocell base station 108, is presently within femtocell service region 202, and has a wireless link established with this femtocell base station 108 exclusive of any other base stations. In other words, the set of mobile devices 124 registered and presently in communication with femtocell base station 108 may be part of a set of femtocell service region mobile devices.

All mobile devices 124 within femtocell service region 202 may include in-home mobile devices and visiting mobile devices. As an example, the mobile phones belonging to family members of a home or office workers assigned to work in a particular office building may be viewed as in-home mobile phones whereas the mobile phones of guests, visitors, those passing near the office building on the street may be viewed as visiting mobile devices, even though they may be registered with femtocell base station 108 to be served by femtocell base station 108 in place of macrocell base station 106.

As people move in and out of femtocell service region 202, their mobile device 124 may move in and out of femtocell service region 202. Thus, the makeup of the set of all mobile devices 124 within femtocell service region 202 may change over time. Femtocell base station 108 may use a unique number associated with each mobile device 124 such as an Assigned Phone Number (APN), International Mobile Subscriber Identity (IMSI), Electronic Serial Number (ESN) to determine whether a mobile device is within femtocell service region 202.

All mobile devices 124 within femtocell service region 202 may be part of a general femtocell base station alert set. A general femtocell base station alert set may include both the in-home set and other mobile phones registered with femtocell base station 108 or within coverage region of femtocell base station 108. Under certain circumstances, there may be reasons not to alert all the service region mobile devices. For example, a caller to building 200 may not expect a temporary visitor to be alerted to their phone call. Here, a caller is unlikely to be aware of visiting mobile devices and it may be desirable to exclude visiting mobile devices from those in an alert group such that visiting mobile devices do not receive alerts.

At step 306 may determine an alert group of mobile devices 124 to receive paging messages that notify mobile devices 124 of an in coming call. The alert group may be limited to an in-home set of mobile devices 124 such as those mobile devices 124 pre-registered with femtocell base station 108 and exclude transient mobile devices 124. Here, mobile devices 124 within the alert group may be subject to the multi-handset paging. The alert group may be alerted (subject to blocking features) whenever a call is made to one of the group members or to the number assigned to femtocell base station 108 itself. In one example, the alert group of mobile devices 124 may be less than the service region set of mobile devices 124. Either the mobile device 124 or femtocell base station 108 may include programming to recognize these situations.

Each mobile device 124 may have a unique identification number. Members of the alert group may be identified by a list of unique identification numbers stored within femtocell base station 108. When a call comes into femtocell base station 108, femtocell base station 108 may compare the number against the list of unique identification numbers stored within femtocell base station 108. If the called number is on the list, then the call is meant for an in-home mobile device 124 and multi-handset paging may apply. Creating an in-home group and then alerting more than one device in that group is an important feature of method 300. If the called number is not on the list, then the call is not meant for an in-home mobile device 124 and is meant for a visiting or transient mobile device 124. Even though the visiting device presently may be in communication with the femtocell base station 108, it may be omitted from participating in method 300 where it is not pre-registered with femtocell base station 108.

The list of unique identification numbers stored within femtocell base station 108 may be generated in a variety of way. For example, a homeowner or a business manager may enter the unique identification numbers into femtocell base station 108 from a list of in-home mobile device identification numbers. The mobile phone service provider may enter the unique identification numbers into femtocell base station 108 based on service contracts. In one example, a visiting or transient mobile device 124 may be a mobile device whose service by femtocell base station 108 may be less than five days and an in-home mobile device 124 may be a mobile device whose service by femtocell base station 108 may be five or more days. That is to say, the time in which a mobile device is in continuous communication with femtocell base station 108 may act to preregister the unique identification number of that mobile device 124 as an in-home mobile device such that the mobile device becomes part of the alert group.

At step 308, method 300 may determine whether a call is received into femtocell base station 108. The calls may come into femtocell base station 108 through a variety of paths, including through landline 104 and macrocell base station 106. A call into a femtocell base station 108 may be a call to either femtocell base station 108 itself or to one or more of devices 124 within the femtocell coverage area 202. If it is a call to a device 124 within the femtocell coverage area 202, that device 124 may belong to either an in-home set or not. A call to a particular device 124 is received if communication protocol of the Radio Access Technology supported by femtocell base station 108 requires femtocell base station 108 to attempt alerting that device. If method 300 determines that no call has been received into femtocell base station 108, then method 300 may return to step 304. If method 300 determines that a call has been received into femtocell base station 108, then method 300 may proceed to step 310.

Each mobile device 124 within the alert group of mobile devices may have a unique identification number. In addition, femtocell base station 108 may have its own unique identification number to allow a caller to reach a particular location of femtocell base station 108 rather than a particular mobile device. The unique identification number of femtocell base station 108 may be viewed as a house phone number or a business phone number, whose geographic location may be known to the caller. The unique identification number of femtocell base station 108 may be a common number to each mobile device 124 within femtocell service region 202.

Calls into femtocell base station 108 may be classified as those directed to a particular mobile device 124 as a target mobile device and those directed to femtocell base station 108. Thus, at step 310, method 300 may determine whether an incoming call is for a target mobile device or whether it is a call to femtocell's own number. Here, method 300 may apply in two satiations: a) where a device is preregistered and is being called, and b) the femto's own number being called. If the call is specific to the phone number of femtocell base station 108 so that method 300 determines that the incoming call is for femtocell base station 108, then the femtocell base station number has been called and method 300 may proceed to step 312. If method 300 determines that the incoming call is for a target mobile device, then a target mobile device number has been called and method 300 may proceed to step 314. The call may be from a third device, such as a third mobile device, a third fixed device, a PSTN device, an internet based device, and the like.

At step 314, method 300 may determine whether a multi-respond feature has been enabled. An enabled multi-respond feature may allow transmission of the same paging message to more than one mobile device 124. A disabled multi-respond feature may mean that only the target mobile device can answer the call. The multi-respond feature may be toggled on or off at femtocell base station 108.

If method 300 determines that the multi-respond feature has not been enabled, then a paging message is sent only to the target mobile device at step 316 and method 300 may end at step 318. Here, femtocell base station 108 may alert the target mobile device such as through the paging channel of the radio access technology employed by femtocell base station 108. Rather than a first responder having an opportunity to answer the call, only the called mobile device 124 may have an opportunity to answer the call since a paging message is not sent to other mobile device 124.

If method 300 determines at step 314 that the multi-respond feature has been enabled, then method 300 may implement a predetermined paging message order at step 320. An alert or paging message may include a page sent to one or more mobile devices 124 that may cause mobile device 124 to ring, vibrate, or react in some way to indicate that a call is ready to be received at that mobile device. With two or more mobile devices 124 destined to receive an alert, femtocell base station 108 may be programmed to send the alerts out in sequential paging or simultaneous batch paging. For example, a paging message may be sent to mobile device 128. If mobile device 128 does not pick up after a certain amount of time or a certain amount of time has passed, an alert regarding the same in coming call may be sent to mobile device 126. After time has passed or some action has not been taken with a certain amount of time, a paging message then may be sent to mobile device 130. If mobile device 130 does not pick up after a certain amount of time or a certain amount of time has passed, an alert regarding the same in coming call may be resent to mobile device 128 and the alert sequence repeated. In a simultaneous paging example, a call to mobile device 130 may result in an alert being sent simultaneously or sequentially but without any intentional time gaps between the pages to mobile device 126, mobile device 128, and mobile device 130.

At step 322, method 300 may send out paging messages per the predetermined alert order of step 320. A paging message may be a message sent by femtocell base station 108 on a paging channel to a mobile device 124 to indicate that there is an incoming phone call. When a mobile device 124 receives a paging message, the mobile device 124 may send a message to femtocell base station 108 requesting a traffic channel. A traffic channel may be a channel that carries communication signals, such as a phone call. When mobile device 124 desires to enter into a call, mobile device 124 may make a request to femtocell base station 108 on the access channel or as specified by the supported Radio Access Technology, and femtocell base station 108 may send back a message telling mobile device 124 which traffic channel to use (in an IS-95 CDMA system it would be which Walsh Code to use). When a traffic channel is granted, mobile device 124 rings, vibrates, etc. to tell its user that a phone call is waiting. Here, femtocell base station 108 may use its Paging Channel of the Radio Access Technology to alert the particular handset called as well as one or more other handsets belonging to an in-home set. The paging message may include unique identifiers of those mobile devices 124 within the alert group. In one example, the unique identifier may be a unique number associated with a mobile device 124.

Using IS-95 Radio Access Technology as an example, approximately every 2.5 seconds, a mobile device 124 may use a little energy to monitor signals from femtocell base station 108. In quick paging, an indicator may be received first and a group of mobiles that qualifies then may keep listening to see if a unique identifier is sent to a specific mobile. An indicator takes far less time, which may result in saving energy. Thus, if the signals received by mobile device 124 do not include the unique identifier of the mobile device 124 or an indicator requiring the device to continue monitoring the channel, then the mobile device 124 does not react to the signal. If the signals received by mobile device 124 does include the unique identifier of the mobile device 124, then the mobile device 124 may react to the signal. At step 324, mobile devices 124 may receive an alert. Under some circumstances, the user of a mobile device 124 may desire not to receive the paging message. For example, if the call is for a mobile device other than the mobile device utilized by the user, then the user may want to reject a transmitted alert. Here, the user may program their mobile device 124 not to respond to an alert. Thus, less than all mobile devices within the alert group may react to a received alert.

At step 326, method 300 may determine whether a responder mobile device 124 has answered the call. A responder mobile device 124 may be a mobile device that is part of the alert group, which may include the target mobile device. If a responder mobile device 124 has answered the call, then a minimum of a two-way call may have been established with that responder mobile device 124. Connection (call, traffic channel) may be permitted with the first mobile device 124 that responded to the paging message. If method 300 determines that a responder mobile device 124 has not answered the call, method 300 may return to step 326. This return to step 326 may be subject to a general time out limit. A general time out limit may be the passage of time, such as thirty seconds, after which method 300 may proceed to step 318. If method 300 determines that a responder mobile device 124 has answered the call, then method 300 may proceed to step 328.

Each mobile device 124 may include programming that blocks other non-targeted mobile devices from answering an alert when enabled. If the first and only feature is enabled on the responder mobile device 124 or within femtocell base station 108, then the first handset to respond grabs the line and all others are blocked. In most situations, a user may desire to set the first and only feature to No. However, setting the first and only feature to Yes may be least costly in terms of resources.

Thus, at step 328, method 300 may determine whether a user has opted to block others from answering the alert by enabling the first and only feature. If method 300 determines that a user has opted to block others from answering the alert, then responder mobile devices other than the first mobile device to answer the call may be blocked from answering the alert at step 330 and method 300 may end at step 318. A response received by a femtocell base station on an access channel could also qualify as an indicator for the femtocell base station to terminate paging to all others such that it may not be necessary to proceed to establishing traffic. This may save some resources. Here, the first mobile device 124 whose response was received by femtocell base station 108 may establish a traffic channel with femtocell base station 108 to an exclusion of all other mobile devices 124 within the alert group.

To meet the expectations of the caller and the person being called, the target mobile device may have a primary control over who has access to the phone call. Method 300 may give control to the target mobile device to prevent other mobile devices 124 from continuing to participate in or subsequently respond to a call. Thus, if method 300 determines at step 328 that a user has not opted to block others from answering the alert, then method 300 may determine at step 332 whether the responder of step 326 is the target mobile device.

If method 300 determines at step 332 that the responder of step 326 is the target mobile device, then method 300 may proceed to step 346 to implement settings of the target device. If method 300 determines at step 332 that the responder of step 326 is not the target mobile device, then method 300 may proceed to check to determine whether a conference call feature has been enabled and whether the target mobile device has answered the paging message within a predetermined time limit.

If method 300 determines at step 332 that the responder of step 326 is not the target mobile device, then method 300 may determine at step 334 whether a conference call feature has been enabled. The conference call feature may allow additional mobile devices to join an ongoing call. In other words, the conference call feature may enable a second mobile device 124 that responds on an access channel to be granted a traffic channel and join in the call. This may be a desirable feature where the caller desires to speak with several people in the alert group. In addition, the user of the target mobile device may find it desirable to bring in other members of the alert group into the call. The conference call feature may be toggled on or off and otherwise controlled at femtocell base station 108.

Femtocell base station 108 may know the time when it started sending out alerts at step 322 and may know the time when the first phone responded on access channel. Thus, femtocell base station 108 may start the timer at either of these, implementation dependent. Accordingly, if method 300 determines at step 334 that the conference call feature has not been enabled, then method 300 may determine at step 336 whether a predetermine amount of time has passed since the alerts were sent by femtocell base station at step 322 or received by the first responder at step 324. This time out parameter may prohibit the target mobile device from establishing a traffic channel with femtocell base station 108. This may be desirable where the person who utilizes the target mobile device is away from the target mobile device. In one example, the predetermined amount of time may be thirty seconds from the first receipt of the alert. It also conserves resources by limiting the amount of time during which paging messages are being sent by femtocell base station If method 300 determine at step 336 that a predetermine amount of time has passed since the alerts were sent at step 322 or received by the first responder at step 324, then method 300 may end at step 318 with the result that the first responder remains on the call and target had not been reached. The use of either step 322 or step 324 as starting point for time limit is implementation dependent. Use of step 324 may be advantageous if the first responder is given allowed to modify the time out limits. Since conference call is disabled and the first responder is already on the call, no other phone except the target should be allowed to grab the line at this point in method 300. If method 300 determine at step 336 that a predetermine amount of time has not passed since the target mobile device first received the alert at step 324, then method 300 may return to step 332.

Returning to step 332 even after method 300 determines at step 334 that the conference call feature is not enabled importantly allows the target mobile device to implement a target mobile device conference as a "Target Conference." Here, a first responder has already established a traffic channel with femtocell base station 108 while femtocell base station 108 continues to send a paging message to the target mobile device, even though the conference call feature is not enabled. If the target mobile device responds to the paging message within the predetermined amount of time set for step 336, the target mobile device may grab the line by disconnecting other mobile devices 124 currently on the call. The grab-disconnect feature particularly may be useful in systems not capable of conference calling. Conferencing is difficult to implement in cellular systems. In addition, if the target mobile device responds to the paging message within the predetermined amount of time set for step 336, the target mobile device may conference-in and then may continue in target conference mode with the other mobile device(s) or may block other mobile device(s) from answering the call. Either way, returning to step 332 even after method 300 determines at step 334 that the conference call feature is not enabled may continue to allow the target mobile device to answer the call, establish a traffic channel with femtocell base station 108, and exercise subsequent control over the responder of step 326. Importantly, the conference gate of step 334 and the time limit of step 336 create a Target Conference feature without expending resources in creating a Target Conference gate.

If method 300 determines at step 334 that the conference call feature has been enabled, then a next responder may connect to the call at step 338, even if the next responder is not the target mobile device. Thus, two or more responders may join in the ongoing, multi-way conference call. In general, message paging may have a limited time duration, so only those mobile devices 124 that responded within a predetermined time limit can join in.

At step 340, method 300 may determine whether the next responder, whether the second responder or a subsequent responder, is the target mobile device. As in step 332, if the next responder is the target mobile device, method 300 may proceed to step 346.

If method 300 determines at step 340 that the next responder is not the target mobile device, then method 300 may determine at step 342 whether a predetermine amount of time has passed since the alerts were received at step 324 or sent at step 322. In one example, the predetermined amount of time may be thirty seconds from the first receipt of the alert. In general, message paging may have limited time duration, so only those mobile devices 124 that responded within a predetermined time limit can join in. The paging time limit for the target device may be set to a longer period than for other devices. In one example, the predetermined time limit at step 342 (below) may be different from the predetermined time limit at step 356 to give the target mobile device more time to respond to a paging message than non-target mobile devices.

If method 300 determines at step 342 that a predetermine amount of time has passed since the alerts were received at step 324 or sent at step 322, then method 300 may proceed to step 330 to block others from answering the call and then to step 318 to end. If method 300 determines at step 342 that a predetermine amount of time has not passed since the alerts were received at step 324, then method 300 may proceed to step 344.

There may be a limit to the number of mobile devices that can be served by femtocell base station 108 at any one time. In addition, the number of mobile devices 124 that may join an on-going conference may be subject to a predetermined conference limit. In one example, the predetermined conference limit may be less than the number of mobile devices that can be served by femtocell base station 108 at any one time. This may allow femtocell base station 108 to serve mobile devices 124 that are not participating in the multi-user conference call.

Thus, at step 344, method 300 may determine whether the number of mobile devices communicating with femtocell base station 108 as part of the multi-user conference call exceeds a predetermined conference limit. In one example, the predetermined conference limit may be five mobile devices. In another example, the predetermined conference limit may be one hundred mobile devices. In a further example, a ratio of the number of mobile devices that can be served by femtocell base station 108 at any one time to the predetermined conference limit may be two to one.

If method 300 determines at step 344 that the number of mobile devices communicating with femtocell base station 108 as part of the multi-user conference call does not exceed the predetermined conference limit, then method 300 may return to step 338. If method 300 determines at step 344 that the number of mobile devices communicating with femtocell base station 108 as part of the multi-user conference call does exceed the predetermined conference limit, then method 300 proceeds to step 330. At step 330, other mobile devices may be blocked from answering the paging message and connecting into the call. In other words, all other mobile devices 124 that respond on an access channel after the conference call limit has been exceeded may be denied a traffic channel.

As noted above, method 300 may proceed to step 346 if the responder is the target mobile device. The target mobile device may have a primary control over who has access to the phone call since that may meet the expectations of the caller and the person being called. A control channel may be created between mobile devices 124 and femtocell base station 108 to allow users directed connectivity configuration. This would allow mobile devices 124 to set configurations and also to add and delete mobile devices 124 to/from conference calls. For example, when a number particular to mobile device 128 is called and mobile device 128 answers the call, the user of that target mobile device 128 may use a handset user interface to make a choice of whether to direct the other handsets that responded to be dropped from a call at step 346 or to allow others to add themselves at step 348.

At step 346, method 300 may determine whether to disconnect from the call those mobile devices 124 that are not the target mobile device. In other words, when a particular handset's number is called and it answers, femtocell base station 108 may deactivate all previously established links between the outside caller and other in-house handsets that responded to the same outside call. Either the target phone may have enabled this disconnection feature or the femtocell base station 108 may be programmed to disconnect from the call those mobile devices 124 that are not the target mobile device.

If method 300 determines not to disconnect from the call those mobile devices 124 that are not the target mobile device, then method 300 may determine at step 348 whether to block others from answering the alert. This block others setting may be local to the targeted mobile device or made global under the circumstances at femtocell base station 108. If method 300 determines at step 346 to disconnect from the call those mobile devices 124 that are not the target mobile device or method 300 determines at step 348 to block others from answering the alert, method 300 may proceed to step 330 where others receiving the alert may be blocked from answering the alert.

The target phone may have a choice as to which phones to block. Here, femtocell base station 108 could be preprogrammed to allow different phones to conference-in depending on which phone is the target. A block feature may be setup to allow only certain phones, as specified by their unique identifiers, to be allowed into the conference or to allow a limited number of phones or not to allow any more phones after target phone responds. A femtocell may be preprogrammed to allow or block certain phones depending on which phone is the target. In addition, the determination that the disconnect option has been elected at step 346 may terminate message paging to all mobile devices 124. Blocking others at step 330 additionally may terminate message paging to all mobile devices 124. From step 330, method 300 may end at step 318.

If method 300 determines at step 348 not to block others from answering the alert, method 300 may proceed to step 350. At this point, the target mobile device and any earlier in time responders may be connected to the call. At step 350, method 300 may determine whether any other mobile devices 124 have subsequently answered the page. If method 300 determines that no other mobile device has subsequently answered the page, then method 300 may return to step 350. This routine may be subject to a general time out limit.

If method 300 determines at step 350 that a mobile device 124 subsequently has answered the page, then method 300 may determine at step 352 whether a conference call feature has been enabled. If method 300 determines at step 352 that the conference call feature has been enabled, then a next responder may connect to the call at step 354. As noted above, there may be a limit to the number of mobile devices that can be served by femtocell base station 108 at any one time. It may be important to restrict the number of mobile devices 124 connected to a conference call to allow femtocell base station 108 to handle non-conference call mobile devices 124. Thus, at step 356, method 300 may determine whether a predetermined time limit has been exceeded. In one example, the predetermined time limit at step 358 may be different from the predetermined time limit at step 342 since step 342 may give the target mobile device more time to respond to a paging message whereas step 358 need not account for a target mobile device. If the predetermined time limit has been exceeded method 300 may proceed to step 330 and if the predetermined time limit has not been exceeded, method 300 may proceed to step 358.

At step 358, method 300 may determine whether the number of mobile devices communicating with femtocell base station 108 as part of the multi-user conference call exceeds a predetermined conference limit. If method 300 determines that the number of mobile devices communicating with femtocell base station 108 as part of the multi-user conference call does not exceed a predetermined conference limit, then method 300 may return to step 354.

If method 300 determines at step 352 that the conference call feature has not been enabled or if method 300 determines at step 358 that the number of mobile devices communicating with femtocell base station 108 as part of the multi-user conference call does exceed a predetermined conference limit, then method 300 may proceed to step 330. At step 330, other mobile devices may be blocked from answering the alert and connecting into the call. In other words, all other mobile devices 124 that subsequently respond on an access channel may be denied a traffic channel.

As noted above, if method 300 determines at step 310 that the femtocell base station number has been called and method 300 may proceed to step 312, step 360, and then step 362. Determining the message paging order at step 312, sending the alerts at step 360, and receiving the alerts at step 362 may be similar to determining the alert order at step 320, sending the alerts at step 322, and receiving the alerts at step 324. Method 300 may proceed from step 362 to step 364.

At step 364, method 300 may determine whether a first responder mobile device has answered the page. Any mobile device 124 that answers the page first can establish a connection with the outside caller. In practice, one of mobile devices 124 may respond via an access channel and will be the first to establish a traffic channel to femtocell base station 108 and to enable two-way communication with the outside caller.

If method 300 determines at step 364 that a first responder mobile device has not answered the page, then method 300 may return to step 364. This return to step 364 may be subject to a time out limit that is different from the time limit of step 342, since there is no target phone and the present time out limit does not make special case for a target phone. If method 300 determines that a first responder mobile device has answered the page, then that responder has established a traffic channel with femtocell base station 108 and method 300 may determine whether the responder has opted to block others from answering the alert or whether the first and only feature of step 366 is active in femtocell base station 108. The setting at step 366 may be the same setting utilized at step 328 to toggle the block others feature. If method 300 determines at step 366 that the first responder has not opted to block others from answering the alert and that the femtocell base station is programmed to allow paging others after the first response had been received, then method 300 may proceed to step 352 to determine whether the conference call feature is enabled. If method 300 determines at step 366 that the first responder or femtocell base station 108 has opted to block others from answering the alert, then method 300 may proceed to step 330 where other mobile devices may be blocked from answering the page and the method may end at step 318. From step 318, method 300 may return to step 302.

Modes such as conference, disconnect, and block and their parameters may be set by a local user either through femtocell base station 108, a personal computer connected to femtocell base station 108, or through a feature on a mobile device 124. A user or service provider may configure the parameter of femtocell base station 108 remotely over the Internet.

Figure 4:
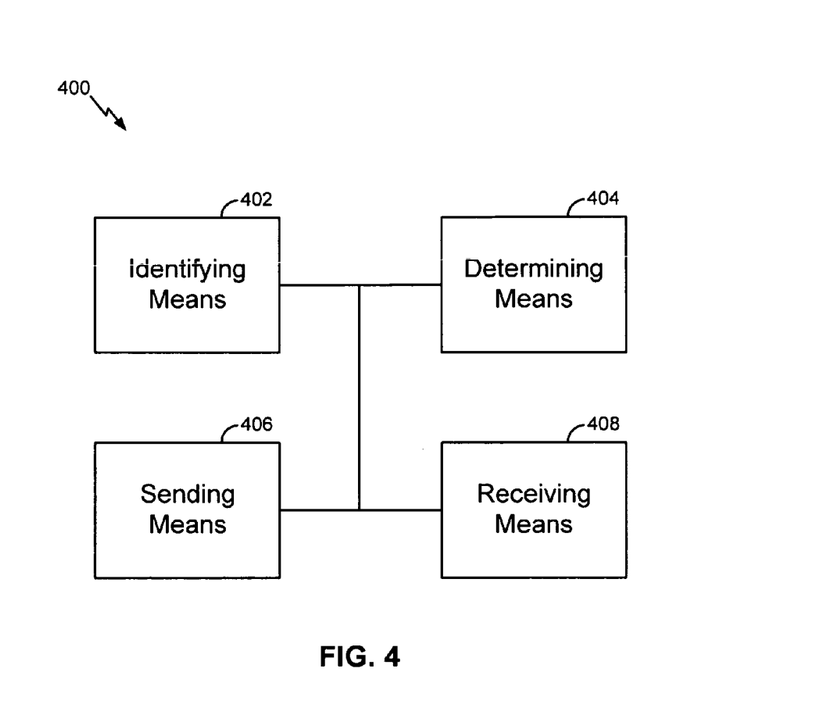
FIG. 4 is a simplified block diagrams of several sample aspects of apparatuses configured to facilitate communication handoff as taught herein.

FIG. 4 is a simplified block diagrams of several sample aspects of apparatuses configured to facilitate communication handoff as taught herein. The components described herein may be implemented in a variety of ways. Referring to FIG. 4, apparatus 400 is represented as a series of interrelated functional blocks. The function block diagram may describe a function between input variables and output variables utilizing a set of elementary blocks where input and output variables may be connected to blocks by connection lines and an output of a block also may be connected to an input of another block. In some aspects, the functionality of these blocks may be implemented as a processing system including one or more processor components. In some aspects, the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. The apparatus 400 may include one or more modules that may perform one or more of the functions described above with regard to various figures. Apparatus 400 may include an identifying means 402, a determining means 404, a sending means 406, and a receiving means 408, each configured to be in communication with other elements of apparatus 400. Outputs of identifying means 402 and determining means 404 may be transmitted between sending means 406 and receiving means 408.

Identifying means 402 may correspond to, for example, a mobile device set identifier such as for mobile devices presently in communication with the femtocell base station and whose unique identifiers are preregistered with the femtocell base station and such as discussed herein. Identifying means 402 may correspond to a processor such as discussed herein. The processor may instruct a receiver to monitor for signals on an uplink and instruct a processor to process any signals received by the receiver. The processor may attempt to demodulate and decode received signals. The processor may generate information relating to acquired signals. The processor may be a central processing unit and may be a machine that can execute computer programs.

A determining means 404 may correspond to, for example, a processor as discussed herein. Determining means 404 may correspond to, for example, a signal processor as discussed herein. The processor may determine whether a received call includes one of a unique identifier of a target mobile device and a unique identifier of the femtocell base station. The processor may determine whether a second mobile device answered a paging message if the call is for the second mobile device. The processor may determine whether a first mobile device answered a paging message if the second mobile device did not answered the call, determine whether to disconnect the first mobile device from a traffic channel with the femtocell base station if the second mobile device answered the paging message and the first mobile device answered the paging message, and determine whether a conference call feature has been enabled in the femtocell base station. In addition, the processor may determine whether to block the second mobile device from answering the paging message if the first mobile device answered the paging message.

A sending means 406 may correspond to, for example, a device such a transceiver to send a paging message from the femtocell base station as discussed herein. Sending means 406 may correspond to, for example, a controller as discussed herein. A receiving means 408 may correspond to, for example, a transceiver to receive a call in the femtocell base station as discussed herein. Receiving means 408 may correspond to, for example, a communication controller as discussed herein. One transceiver may communicate with other transceivers and with other nodes. Each transceiver may include a respective transmitter to send signals and a respective receiver to receive signal. Each transceiver may receive and process a respective information stream to provide one or more analog signals, and further conditions (e.g., amplifies, filters, and upconverts) the analog signals to provide a modulated signal suitable for transmission. A transceiver may include at least one of a transmitter and a receiver, where a transmitter and receiver may be combined and share common circuitry or a single housing.

While the specification describes particular examples of the present invention, those of ordinary skill may devise variations of the present invention without departing from the inventive concept. For example, the teachings herein refer to circuit-switched network elements but are equally applicable to packet-switched domain network elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software clearly, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Part or all of the systems mentioned herein may be implemented as a computer program product on a storage medium having instructions stored thereon/in. These instructions may be used to control, or cause, a computer to perform any of the processes. For example, a computer may execute a computer readable medium having a set of instructions which, when executed by a computer, cause the computer to deliver a coupon to a mobile device using a method described herein. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to communicate between a femtocell base station and mobile devices, the method comprising:
   identifying as an alert group a set of mobile devices presently in communication with the femtocell base station and whose unique identifiers are preregistered with the femtocell base station as in-home mobile devices, where a first mobile device and a second mobile device are in the alert group;
   receiving a call in the femtocell base station from a third device;
   determining at the femtocell base station whether the received call includes a second unique identifier associated with the second mobile device; and
   if the received call includes the second unique identifier associated with the second mobile device, alerting the first mobile device by sending a paging message from the femtocell base station, where the paging message includes a first unique identifier associated with the first mobile device.

2. The method of claim 1, where the paging message is a first paging message, the method after sending the first paging message further comprising:
   sending a second paging message from the femtocell base station, where the second paging message includes the second unique identifier associated with the second mobile device.

3. The method of claim 1, further comprising:
   sending a paging message from the femtocell base station in response to the received call, where the paging message includes the first unique identifier associated with the first mobile device and a second unique identifier associated with the second mobile device.

4. The method of claim 1, further comprising:
   if the received call is for the second mobile device, determining whether the second mobile device answered the paging message; and
   if the second mobile device did not answer the received call, then determining whether the first mobile device answered the paging message.

5. The method of claim 1, where if the second mobile device answered the paging message and the first mobile device answered the paging message, the method further comprising:
   determining whether to disconnect the first mobile device from a traffic channel with the femtocell base station.

6. The method of claim 1, further comprising:
   determining whether a conference call feature has been enabled in the femtocell base station.

7. The method of claim 1, further comprising:
   if the received call is for the femtocell base station, sending a paging message from the femtocell base station in response to the received call, where the paging message includes the first unique identifier associated with the first mobile device and the second unique identifier associated with the second mobile device.

8. The method of claim 7, further comprising:
   accessing a phone number assigned to the femtocell base station; and
   if the first mobile device answered the paging message, determining whether to block the second mobile device from answering the paging message.

9. An apparatus to facilitate communications between a femtocell base station and mobile devices, the apparatus comprising:
   a processor to identify as an alert group a set of mobile devices presently in communication with the femtocell base station and whose unique identifiers are preregistered with the femtocell base station as in-home mobile devices, where a first mobile device and a second mobile device are in the alert group;
   a transceiver to receive a call in the femtocell base station from a third device;
   wherein the processor determines whether the received call includes a second unique identifier associated with the second mobile device; and
   wherein the transceiver alerts the first mobile device by sending a paging message from the femtocell base station if the received call includes the second unique identifier associated with the second mobile device, where the paging message includes a first unique identifier associated with the first mobile device.

10. The apparatus of claim 9, where the paging message further includes the second unique identifier associated with the second mobile device.

11. An apparatus to facilitate communications between a femtocell base station and mobile devices, the apparatus comprising:
    means for identifying as an alert group a set of mobile devices presently in communication with the femtocell base station and whose unique identifiers are preregistered with the femtocell base station as in-home mobile devices, where a first mobile device and a second mobile device are in the alert group;
    means for receiving a call in the femtocell base station from a third device;
    means for determining at the femtocell base station whether the received call includes a second unique identifier associated with the second mobile device; and
    means for alerting the first mobile device, where the means for alerting comprises means for sending a paging message from the femtocell base station if the received call includes the second unique identifier associated with the second mobile device, where the paging message includes a first unique identifier associated with the first mobile device.

12. The apparatus of claim 11, where the paging message is a first paging message, the apparatus further comprising:
    means for sending a second paging message from the femtocell base station after sending the first paging message, where the second paging message includes the second unique identifier associated with the second mobile device.

13. The apparatus of claim 11, further comprising:
    means for sending a paging message from the femtocell base station in response to the received call, where the paging message includes the first unique identifier associated with the first mobile device and the second unique identifier associated with the second mobile device.

14. The apparatus of claim 11, further comprising:
    means for determining whether the second mobile device answered the paging message if the received call is for the second mobile device; and
    means for determining whether the first mobile device answered the paging message if the second mobile device did not answer the call.

15. The apparatus of claim 11, further comprising:
    means for determining whether to disconnect the first mobile device from a traffic channel with the femtocell base station if the second mobile device answered the paging message and the first mobile device answered the paging message.

16. The apparatus of claim 11, further comprising:
means for determining whether a conference call feature has been enabled in the femtocell base station.

17. The apparatus of claim 11, further comprising:
means for sending a paging message from the femtocell base station in response to the received call if the received call is for the femtocell base station, where the paging message includes the first unique identifier associated with the first mobile device and the second unique identifier associated with the second mobile device.

18. The apparatus of claim 17, further comprising:
means for determining whether to block the second mobile device from answering the paging message if the first mobile device answered the paging message.

19. A non-transitory computer-readable medium comprising codes for causing a computer to:
identify as an alert group a set of mobile devices presently in communication with a femtocell base station and whose unique identifiers are preregistered with the femtocell base station as in-home mobile devices, where a first mobile device and a second mobile device are in the alert group;
receive a call in the femtocell base station from a third mobile device;
determine at the femtocell base station whether the received call includes a second unique identifier associated with the second mobile device; and
if the received call includes the second unique identifier associated with the second mobile device, alert the first mobile device by sending a paging message from the femtocell base station, where the paging message includes a first unique identifier associated with the first mobile device.

20. The non-transitory computer-readable medium of claim 19, where the paging message is a first paging message, further comprising codes for causing a computer to:
send a second paging message from the femtocell base station after sending the first paging message further comprising, where the second paging message includes the second unique identifier associated with the second mobile device.

21. The non-transitory computer-readable medium of claim 19, further comprising codes for causing a computer to:
send a paging message from the femtocell base station in response to the received call, where the paging message includes the first unique identifier associated with the first mobile device and the second unique identifier associated with the second mobile device.

22. The non-transitory computer-readable medium of claim 19, further comprising codes for causing a computer to:
if the received call is for the second mobile device, determine whether the second mobile device answered the paging message; and
if the second mobile device did not answer the received call, then determine whether the first mobile device answered the paging message.

23. The non-transitory computer-readable medium of claim 19, further comprising codes for causing a computer to:
where if the second mobile device answered the paging message and the first mobile device answered the paging message, determine whether to disconnect the first mobile device from a traffic channel with the femtocell base station.

24. The non-transitory computer-readable medium of claim 19, further comprising codes for causing a computer to:
determine whether a conference call feature has been enabled in the femtocell base station.

25. The non-transitory computer-readable medium of claim 19, further comprising codes for causing a computer to:
if the received call is for the femtocell base station, send a paging message from the femtocell base station in response to the received call, where the paging message includes the first unique identifier associated with the first mobile device and the second unique identifier associated with the second mobile device.

26. The non-transitory computer-readable medium of claim 25, further comprising codes for causing a computer to:
if the first mobile device answered the paging message, determine whether to block the second mobile device from answering the paging message.

27. The method of claim 1, further comprising preregistering at least one mobile device as a visiting mobile device.

28. The method of claim 27, further comprising re-registering the at least one mobile device as an in-home mobile device when the mobile device communicates with the femtocell base station for longer than a threshold time period.

29. The method of claim 1, further comprising implementing a predetermined paging message order.

* * * * *